(12) United States Patent
Williams

(10) Patent No.: US 6,579,055 B1
(45) Date of Patent: Jun. 17, 2003

(54) ELECTRIC MOTORCYCLE LIFT FOR MOTOR HOMES

(76) Inventor: Richard Williams, 13438 Martin Luther King Blvd., P.O. Box 651, Dover, FL (US) 33527

( * ) Notice: Subject to any disclaimer, the term of this patent is extended or adjusted under 35 U.S.C. 154(b) by 58 days.

(21) Appl. No.: 09/994,345

(22) Filed: Nov. 26, 2001

(51) Int. Cl.⁷ .................................................. B60P 3/07
(52) U.S. Cl. ....................... 414/462; 224/497; 224/521; 224/534; 224/924; 414/540
(58) Field of Search ................................ 224/521, 924, 224/497, 534; 414/462, 540

(56) References Cited

U.S. PATENT DOCUMENTS

| | | | |
|---|---|---|---|
| 3,805,984 A | | 4/1974 | Schwarz et al. |
| 4,191,316 A | * | 3/1980 | Baumgartner ............... 414/462 |
| 4,297,069 A | * | 10/1981 | Worthington ............... 414/462 |
| 4,741,660 A | * | 5/1988 | Kent ........................... 414/462 |
| 4,775,282 A | * | 10/1988 | Van Vliet .................... 414/462 |
| 5,011,361 A | * | 4/1991 | Peterson ..................... 414/462 |
| 5,137,411 A | | 8/1992 | Eul et al. |
| 5,431,522 A | * | 7/1995 | Ross ........................... 414/462 |
| 5,456,564 A | | 10/1995 | Bianchini |
| 5,482,424 A | | 1/1996 | Jones et al. |
| 5,567,107 A | * | 10/1996 | Bruno et al. ................ 414/462 |
| 5,816,763 A | | 10/1998 | Hamann et al. |
| 5,984,613 A | | 11/1999 | Motilewa |
| 6,007,290 A | | 12/1999 | Schulz et al. |
| 2001/0001636 A1 | | 5/2001 | Klinkenberg |

* cited by examiner

Primary Examiner—Janice L. Krizek
(74) Attorney, Agent, or Firm—Larson & Larson, PA; James E. Larson

(57) ABSTRACT

A frame apparatus engages a pair of hitch members permanently attached to the undercarriage structure of a motor home. Brackets containing guide rollers attach a left and right upright movable rail to the frame. An electrically driven set of gears drive a vertically positioned threaded rod attached to a gear housing connected to a transverse portion of the frame apparatus. A bottom of the threaded rod is attached to a transverse rod connecting the left and right movable rails. The bottom portion of such movable rails are attached to rearwardly directed support arms which support a transverse track adapted to transport a motorcycle.

16 Claims, 13 Drawing Sheets

ELECTRIC MOTORCYCLE LIFT FOR MOTOR HOMES

FIELD OF THE INVENTION

This invention relates to motorcycle lifts for use with motor homes. More particularly, it refers to a lift attachable to a trailer hitch mounted on the underside of a vehicle, the lift capable of electrically lifting a motorcycle for transport with the vehicle.

BACKGROUND OF THE INVENTION

Lifting devices attachable to a motor vehicle for transporting motorcycles and other motor vehicles are generally known from U.S. Pat. Nos. 3,805,984; 5,011,361; 5,137,411; 5,456,564; 5,482,424; 5,816,763; 5,984,613 and 6,007,290. Such devices, although suitable for their indicated purposes, do not provide for a motorcycle lift that is used to easily mount a motorcycle, raise the motorcycle to a safe distance above the ground by use of an electric motor and stabilize the motorcycle during transport.

SUMMARY OF THE INVENTION

The present invention describes an easily mountable and demountable lifting device for motorcycles for use with truck chassis vehicles such as motor homes, SUVs and pickup trucks. A frame apparatus is engaged to a pair of hitch members permanently attached to the undercarriage structure of a vehicle such as a motor home. Brackets attach left and right upright movable rails to the frame. An electrically driven set of gears drive a threaded rod attached to a gear housing connected to the frame. A bottom of the threaded rod is attached to a transverse rod connecting the left and right movable rails. The threaded rod lifts or lowers the rails which in turn lift or lower a pair of support arms attached to a lower portion of the corresponding left and right rails. The pair of support arms are attached to a transverse track that retains the motorcycle.

BRIEF DESCRIPTION OF THE DRAWINGS

The invention can be best understood by those having ordinary skill in the art of motor cycle lifts by following the detailed description when considered in conjunction with the accompanying drawings in which.

DETAILED DESCRIPTION OF THE INVENTION

Figure 1:
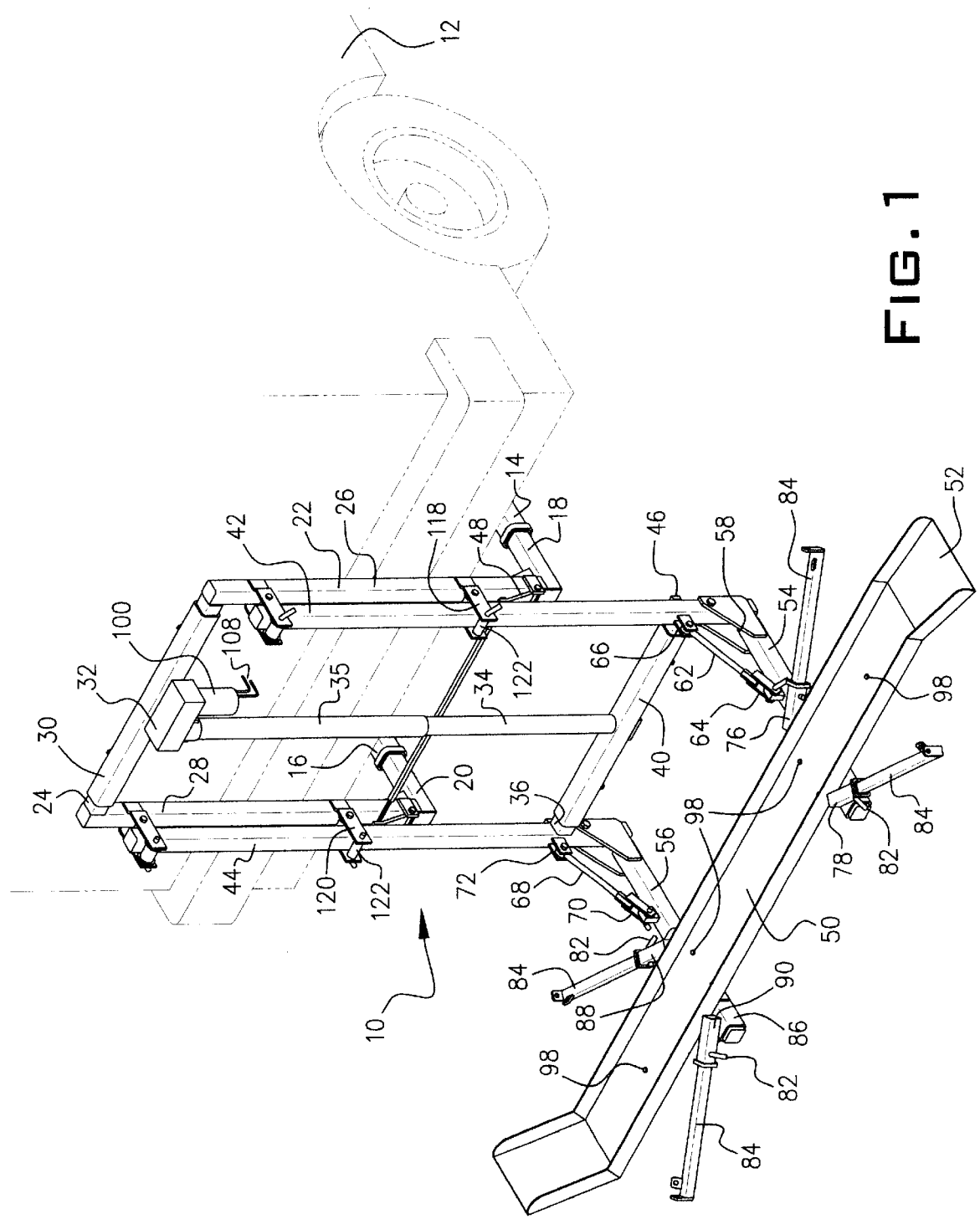
FIG. 1 is a perspective view of the motor cycle lift of this invention hitched to a motor home in the loading position.

Throughout the following detailed description, the same reference numerals refer to the same elements in all figures. Referring first to FIG. 1, the motorcycle lift 10 is removably attached to a motor home 12 or other vehicle such as a pick up truck or SUV. A pair of hitches 14 and 16 are permanently attached to the underside of the motor home 12. Bottom legs 18 and 20 of a frame 22 are engaged within hitches 14 and 16 respectively.

Figure 2:
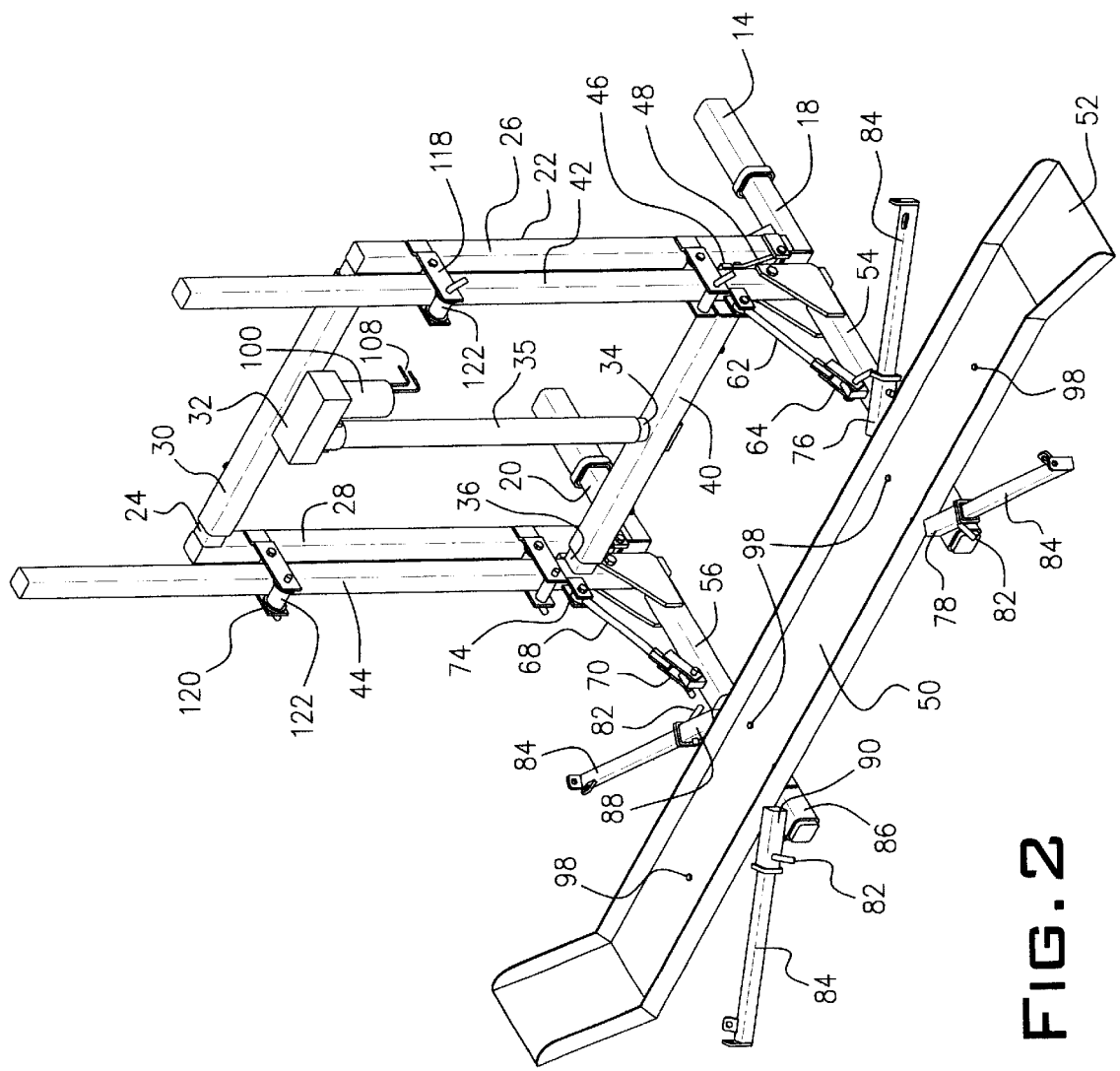
FIG. 2 is a perspective view of the motorcycle lift in the raised carrying position.

Expandable connecting rod 24 joins the top portion of frame 22 upright members 26 and 28 respectively. A connecting sleeve 30 joins sections of connecting rod 24. A gear housing 32 on top of an enclosed threaded rod element 34 contains gears 38 (FIG. 3) which turn rod 34 so that bottom expandable lift rod 36 can move upwardly as shown in FIG. 2 or downwardly for loading as shown in FIG. 1. A connecting sleeve 40 joins sections in bottom expandable lift rod 36. Lift rod 36 is joined at each end to upright rails 42 and 44 respectively.

Figure 4:
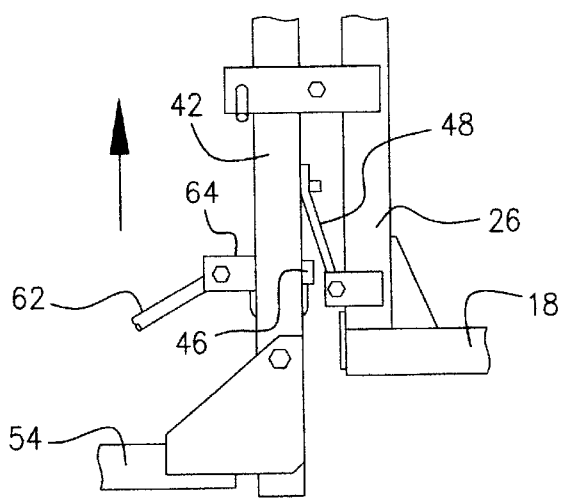
FIG. 4 is a left hand side elevational view of the safety locking mechanism on the lift in the unlocked position.
Figure 5:
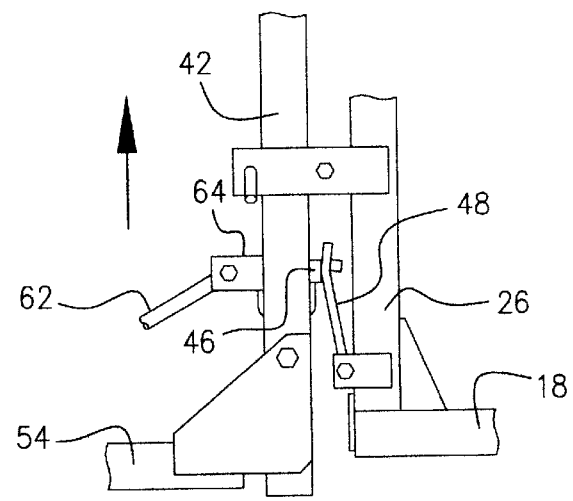
FIG. 5 is a left hand side elevational view of the safety locking mechanism on the lift in the process of moving to the locked position.
Figure 6:
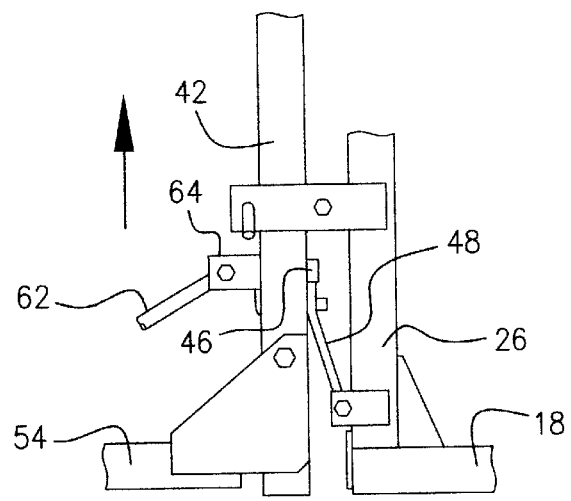
FIG. 6 is a left side elevational view of the safety locking mechanism of the lift in the locked position.
Figure 7:
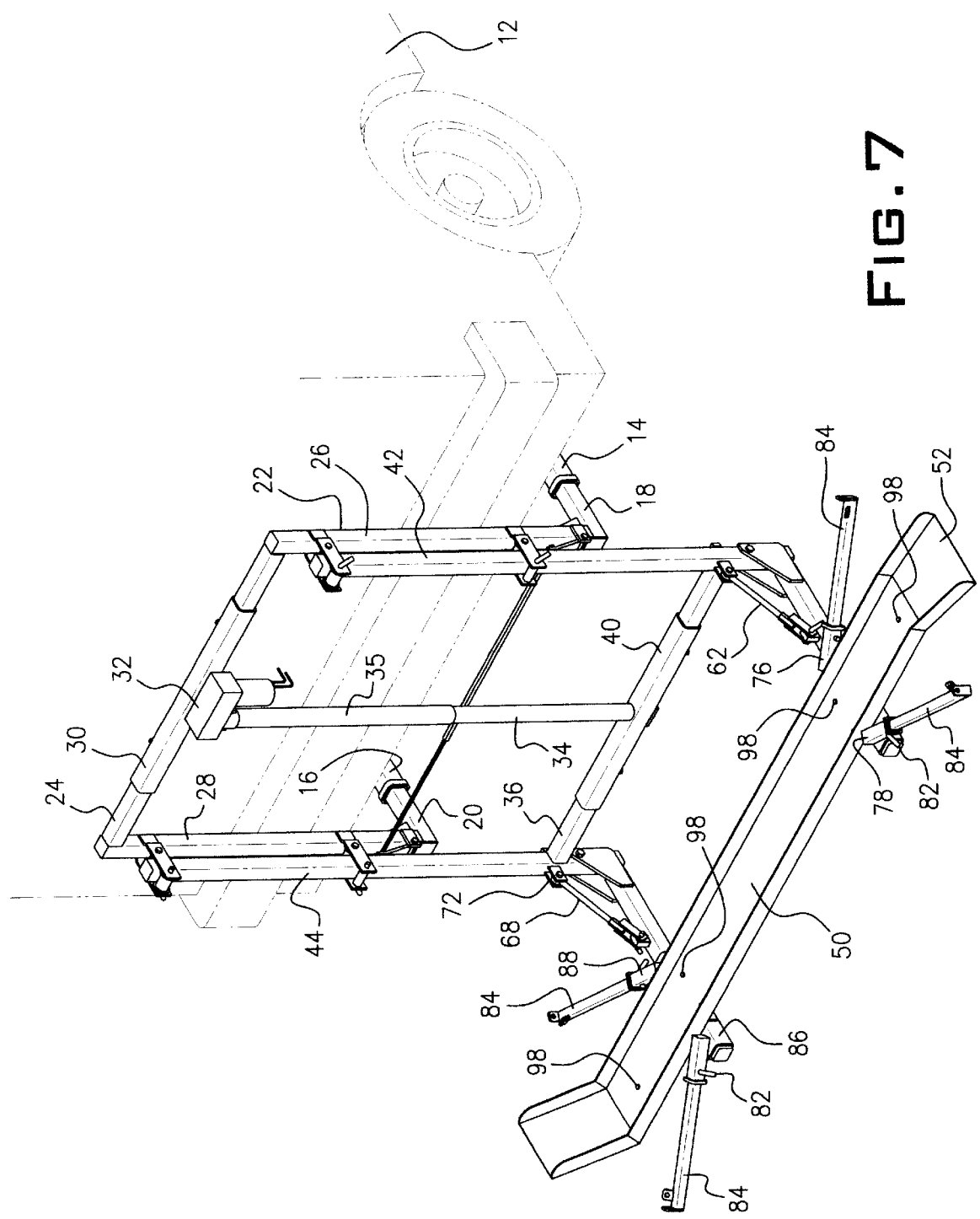
FIG. 7 is a perspective view of the motorcycle lift with the lift frame expanded laterally.
Figure 8:
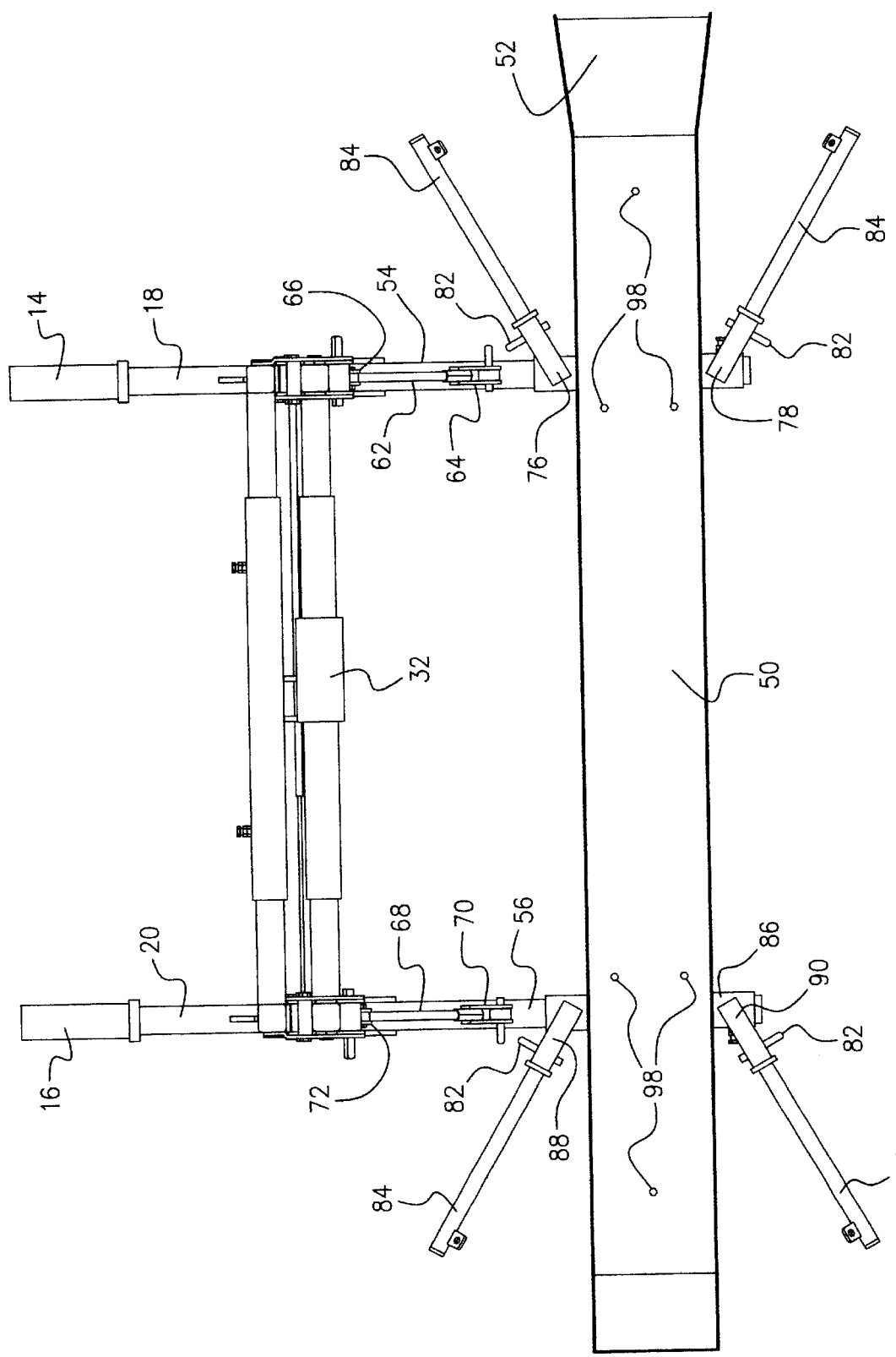
FIG. 8 is a top plan view of the motorcycle lift of FIG. 7.
Figure 9:
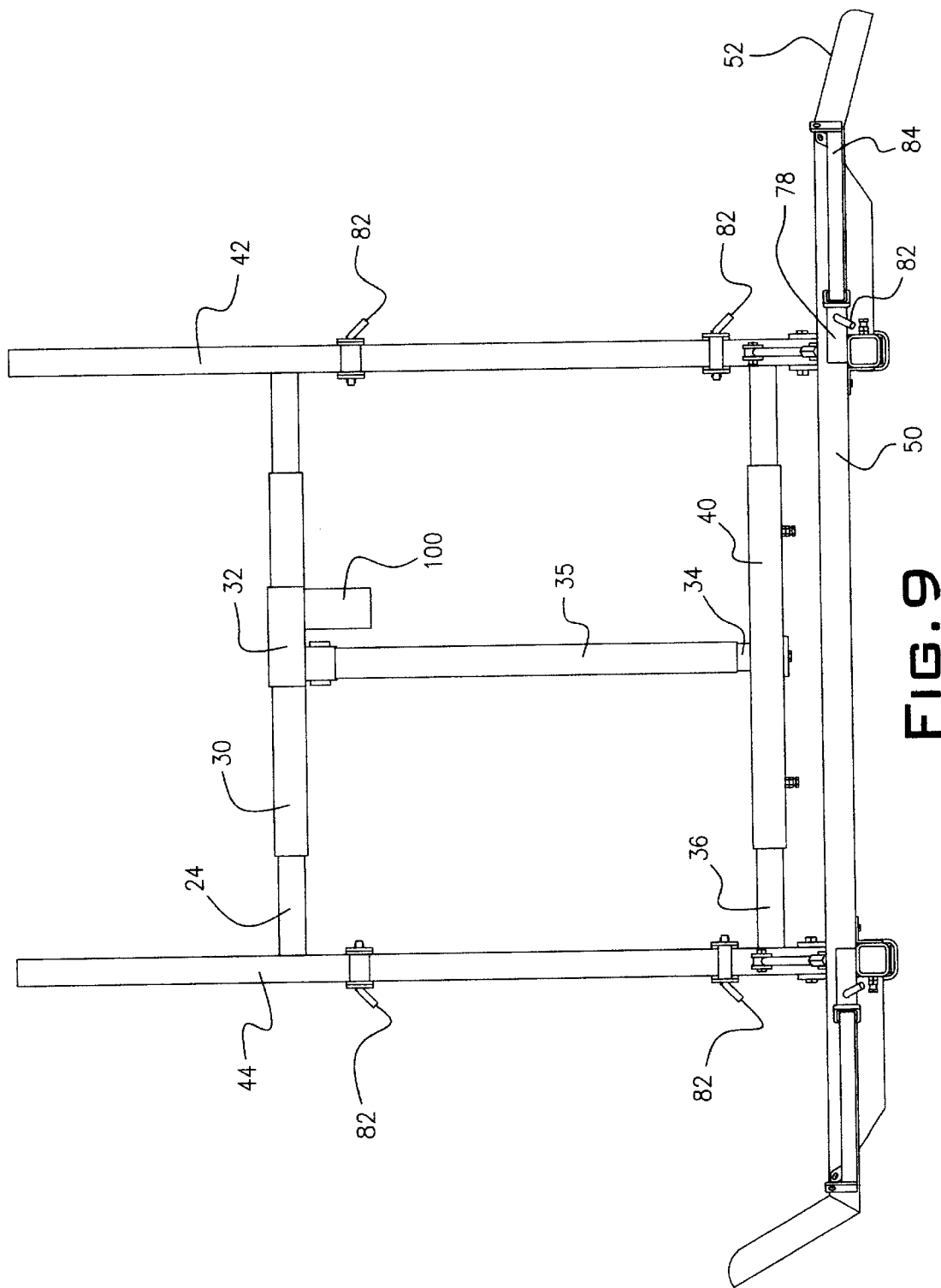
FIG. 9 is a rear elevational view of the motorcycle lift of FIG. 7.

As seen in FIGS. 4–6 in a left hand side elevational view of a lower front portion of motorcycle lift 10, as viewed from the back of the motor home, a safety locking mechanism prevents movement downwardly of the motorcycle lift 10 when in a travel mode. As upright rail 42 moves upwardly, stop 46 contacts plate 48 until it moves past an end of plate 48 and as shown in FIG. 6. The FIG. 6 position prevents upright rail 42 from moving downwardly until plate 48 is moved towards the front of the lift 10.

Figure 10:
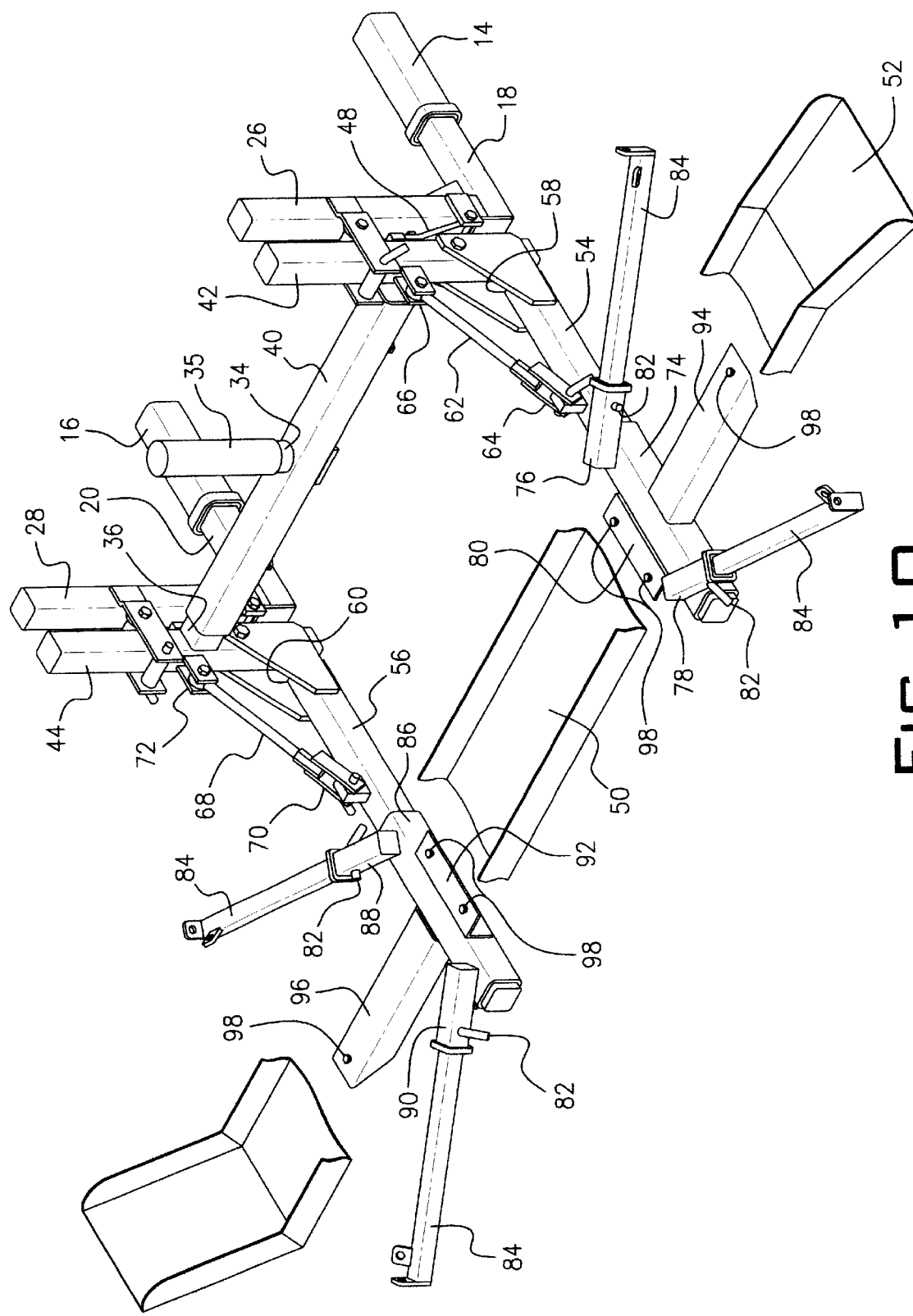
FIG. 10 is a broken view of the lift track showing the manner of its bolting to the fold up arms.
Figure 11:
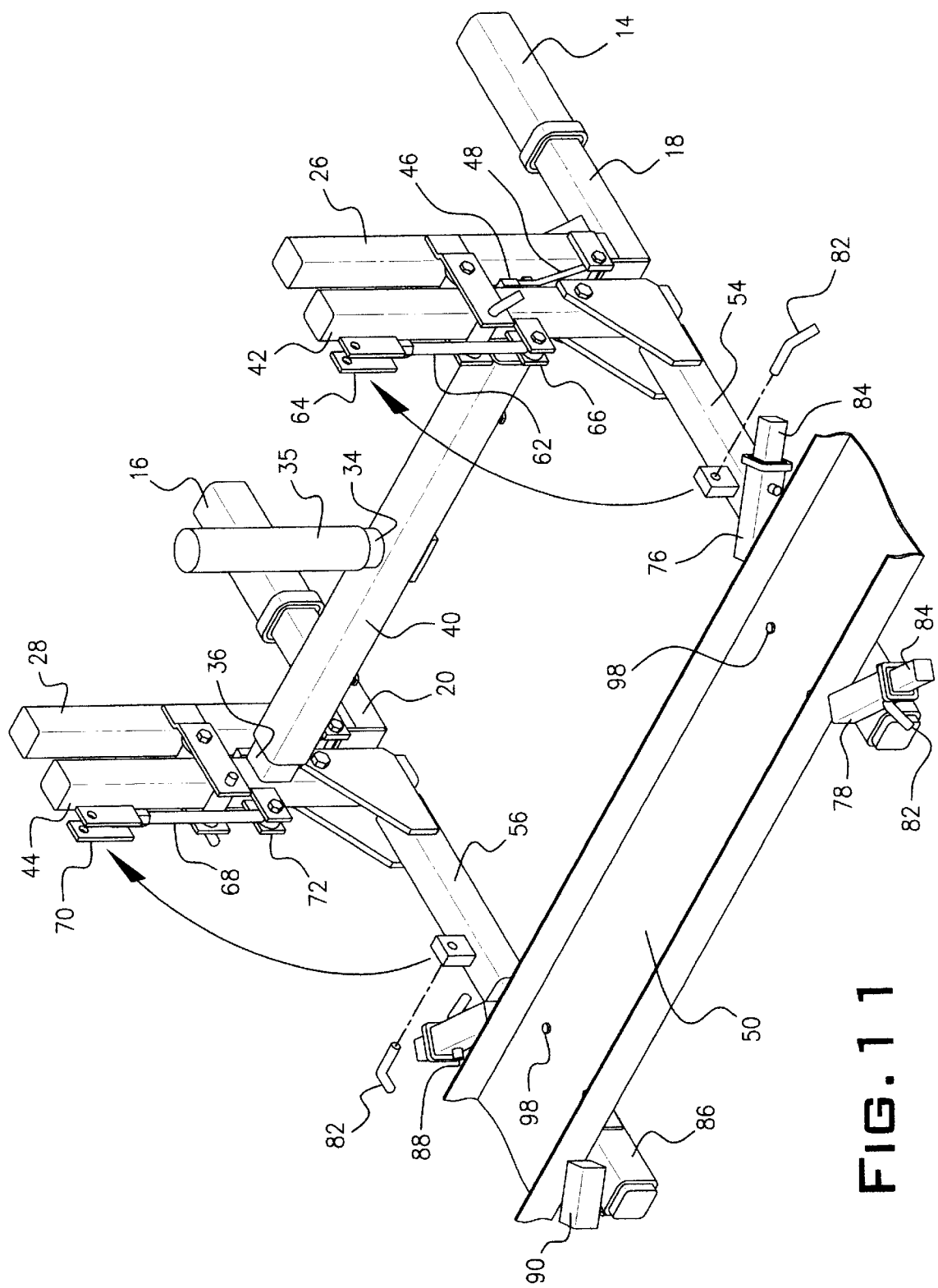
FIG. 11 is a magnified view of the arm lifting mechanism.
Figure 12:
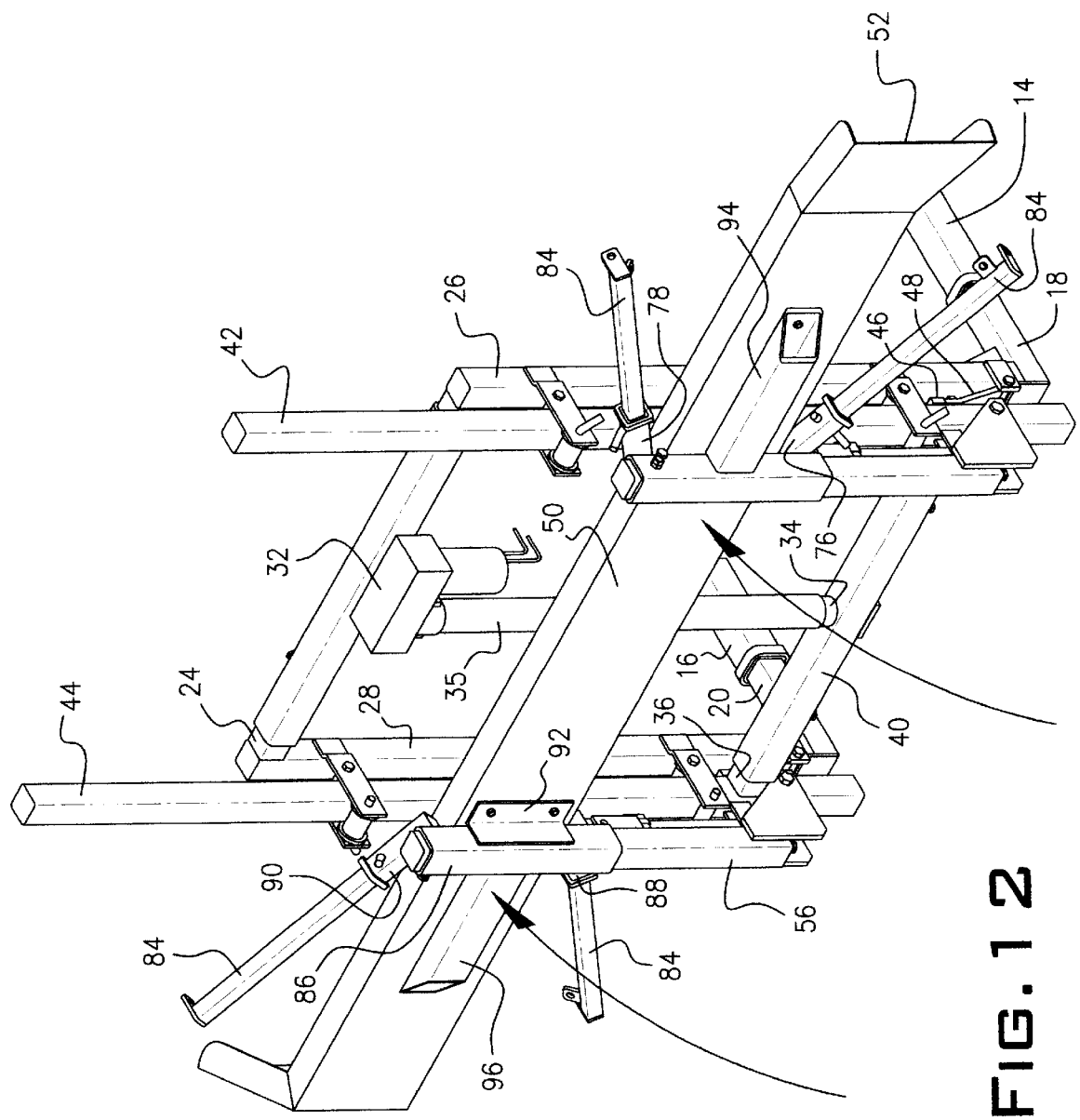
FIG. 12 is a perspective view of the lift raised up for storage when not in use.

When the motorcycle lift 10 is in the load mode as seen in FIG. 1, a track 50 has one end 52 level with the ground allowing a person to walk the motorcycle onto track 50. Pivotable arms 54 and 56 support track 50. The arms 54 and 56 are bolted with bolts 98 to track 50 as seen in FIG. 10. Pivotable arms 54 and 56 abut upright rails 42 and 44 respectively at ends 58 and 60 respectively. Lift arm 62 is attached by bracket 64 to pivotable arm 54. Lift arm 62 also is attached to upright rail 42 by bracket 66. Lift arm 68 is attached by bracket 70 to pivotable arm 56. Lift arm 68 also is attached to upright rail 44 by bracket 72.

Pivotable arm 54 has a sleeve member 74. The sleeve member 74 is welded to tie down support housings 76 and 78 and to L-shaped bracket 80. The tie down support housings 76 and 78 are each connected by a quick release pin 82 to tie down rods 84. In like manner, pivotable arm 56 has a sleeve member 86. The sleeve member 86 is welded to tie down support housings 88 and 90 and to L-shaped bracket 92. Sleeve members 74 and 86 also are welded to track support plates 94 and 96 respectively. Bolts 98 attach the track 50 to brackets 80 and 92 and to plates 94 and 96.

Figure 3:
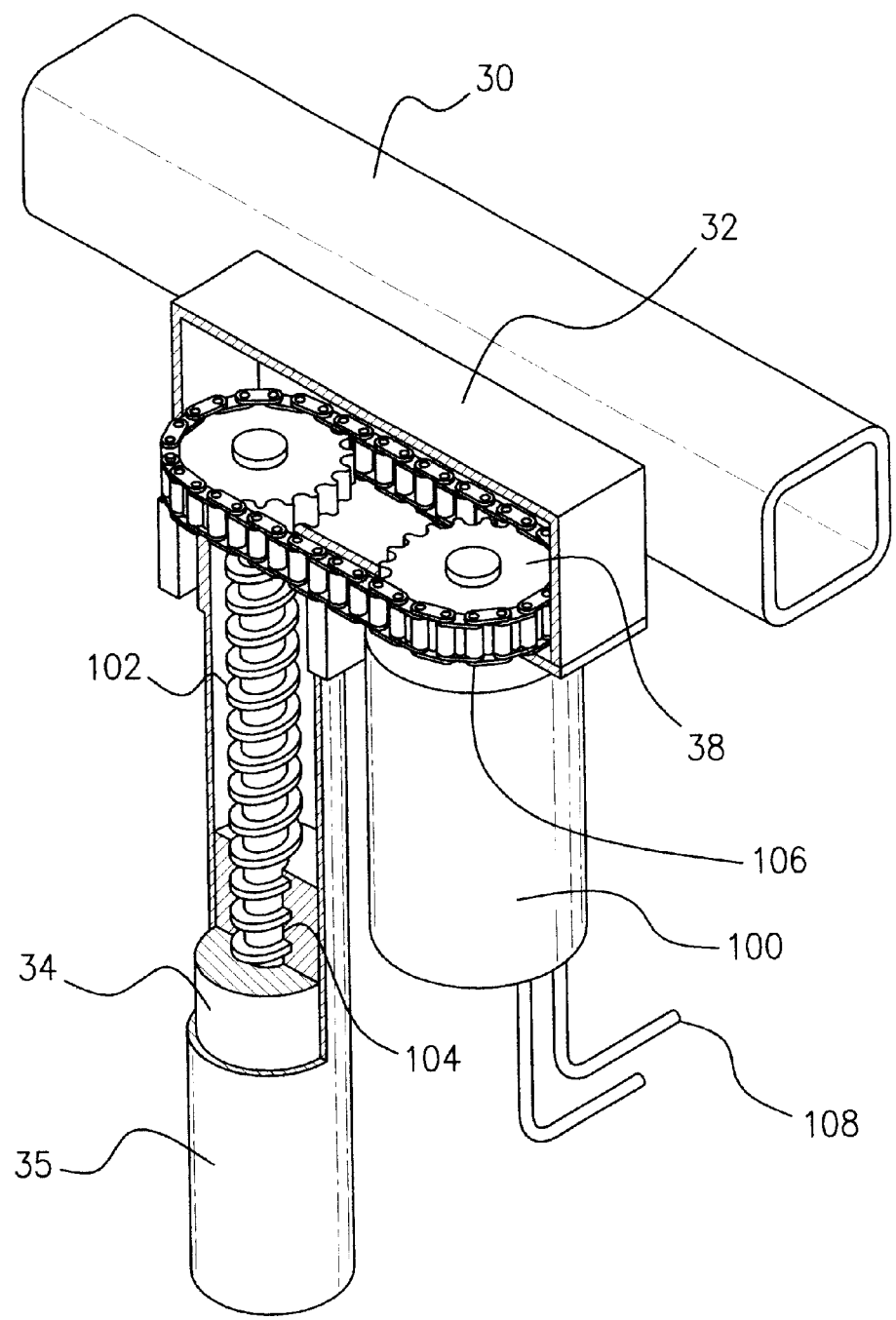
FIG. 3 is a cut-away view of the gear housing exposing the gears and chain drive and a partial cut-away of the cover of the threaded rod.

As shown in FIG. 3, the gears 38 are turned by motor 100 which employs about 35 ohms from a battery mounted in the motor home 12. Wires 108 connect the battery in the motor home 12 to the motor 100. The male 102 and female 104 threads are turned by the gear controlled by chain belt 106.

Movement of the threads 102 and 104 either lowers or raises the lift rod 36 which moves rails 42 and 44. Rollers 122 mounted within brackets 118 and 120 maintain a proper upright position for rails 42 and 44, respectively.

Figure 13:
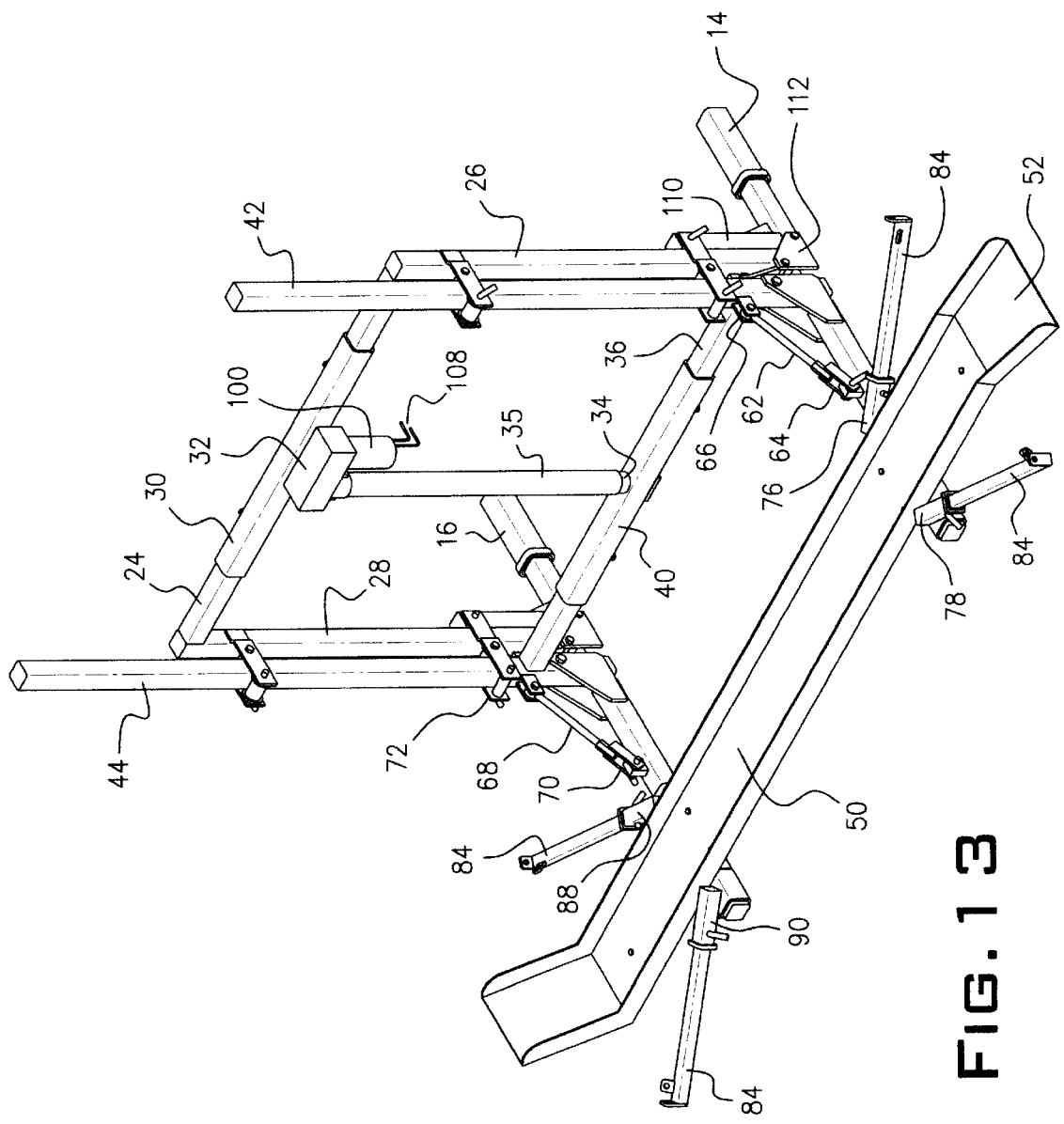
FIG. 13 is a perspective view of an alternative motor cycle lift.
Figure 14:
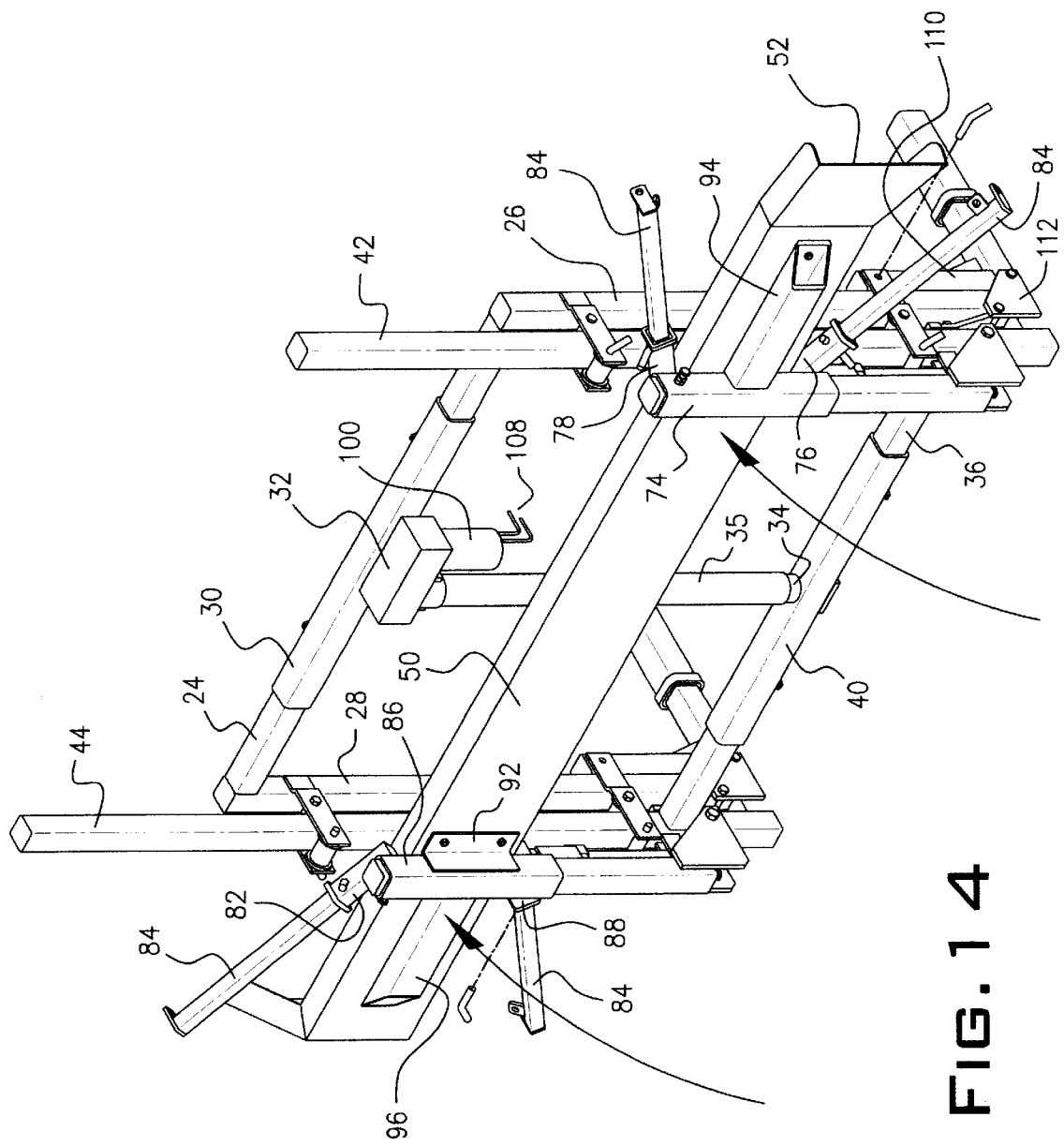
FIG. 14 is a perspective view of the alternative lift of FIG. 13 in the storage position.
Figure 15:
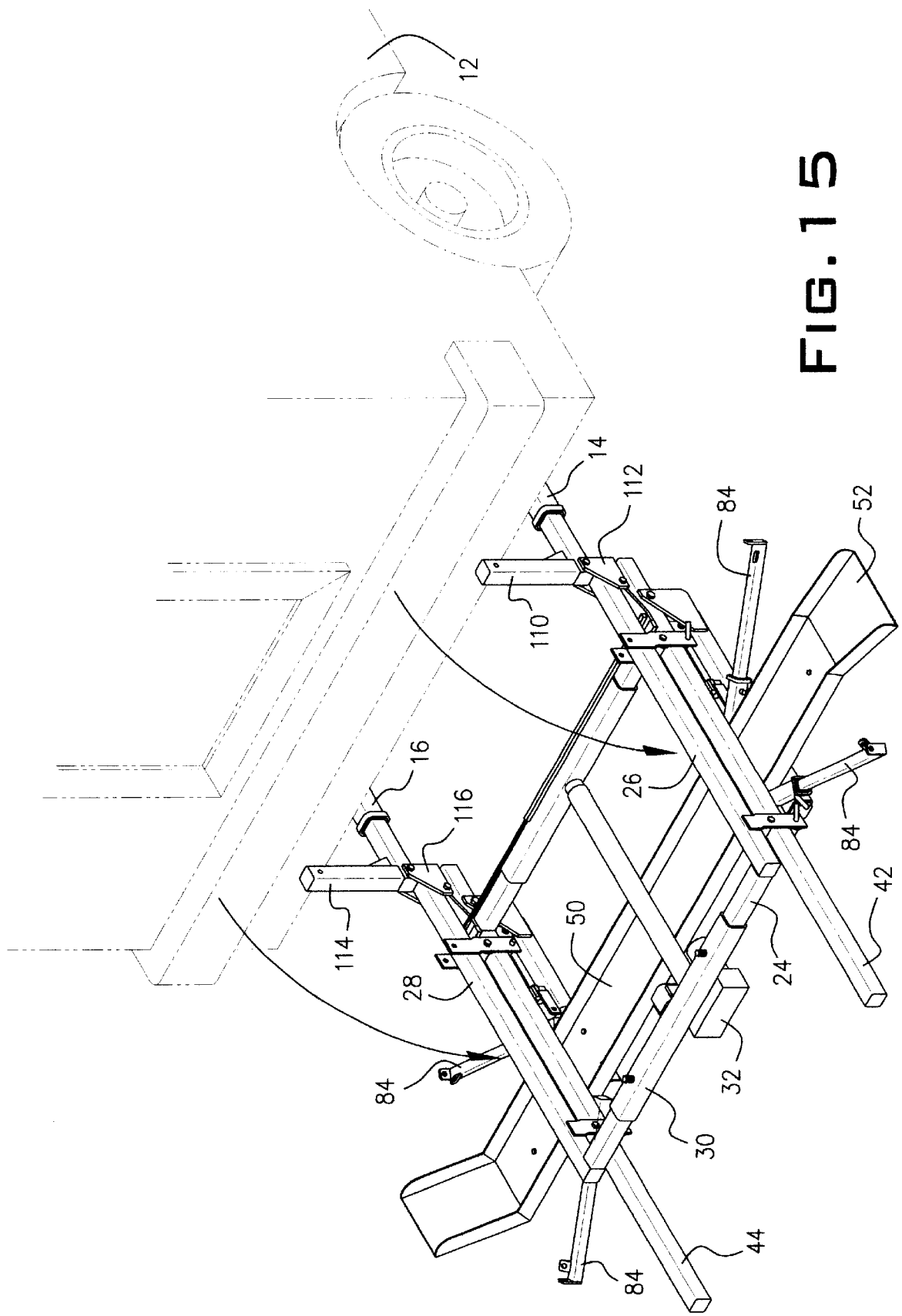
FIG. 15 is a perspective view of the alternative lift of FIG. 13 when dropped for access to the rear of the motor home.

FIGS. 13–15 show an alternate embodiment which permits access to the rear portion of the motor home 12 without the need to remove the frame 12 from the hitches 14 and 16. In this embodiment an L-shaped arm 110 is attached to upright frame member 26. Upright frame member 26 pivots downwardly from L-shaped arm 110 at the juncture with bracket 112. At the same time, upright frame member 28 pivots downwardly from L-shaped arm 114 at the juncture with bracket 116. Removal of a quick release pin 82 from openings 124 and 126 in L-shaped arms 110 and 144, respectively allows the frame 22 to drop down as seen in FIG. 15.

The above description has described specific structural details of the motorcycle lift of this invention. However, it will be within the knowledge of one having ordinary skill in the art to make modifications without departing from the spirit and scope of the underlying invention's inventive concept. The inventive concept is not limited to the structure described, but includes such modifications as would be considered equivalent.

Having thus described the invention, what is claimed and desired to be secured by Letters Patent is:

1. An electrically driven motorcycle lift for mounting adjacent a rear portion of a vehicle, the lift comprising:
 a frame member engaged at a bottom left and right leg to corresponding left and right hitch members permanently attached to an underside frame of the vehicle,
 a left upright rail juxtaposed to a left upright frame member at a right angle to the left leg;
 a right upright rail juxtaposed to a right upright frame member at a right angle to the right leg;
 a transverse frame member joining a top portion of the left and right upright frame members;
 a transverse rail member joining a bottom portion of the left and right upright rails;
 a left and right support arm pivotably attached to the left and right rails respectively;
 a track for receipt of a motorcycle attached to and supported by the left and right support arms; and
 the rails moving in response to a vertical screw drive attached at a top end to a housing mounted to the transverse frame member, the vertical screw drive attached to the transverse rail member at a bottom end, the vertical screw drive turning by an electric motor actuating a gear chain drive within the housing.

2. The electrically driven motorcycle lift according to claim 1 wherein the vehicle is a motor home.

3. The electrically driven motorcycle lift according to claim 1 wherein the housing containing the gear chain drive and a pair of electrically driven gears is attached to a mid-portion of the transverse frame member.

4. The electrically driven motorcycle lift according to claim 1 wherein each support arm has a pair of tie-down support housings welded to a cover attached to the support arm.

5. The electrically driven motorcycle lift according to claim 3 wherein a tie-down rod extends from each tie-down support housing.

6. The electrically driven motorcycle lift according to claim 1 wherein a pair of brackets attach the left upright rail to the left upright frame member and a pair of brackets attach the right upright rail to the right upright frame member.

7. The electrically driven motorcycle lift according to claim 6 wherein each bracket contains a pair of rollers to promote movement of the upright rails with respect to the upright frame members.

8. A motorcycle lift for mounting adjacent a rear portion of a motor home, the lift comprising:
 a frame apparatus engaged at a lower end to a pair of hitch members permanently attached to an underside structure of the motor home;
 a left and right upright vertically movable rail attached by brackets to a left and right upright portion of the frame apparatus;
 a gear and chain housing enclosing a gear and chain attached to a transverse rod portion of the frame apparatus, the transverse rod portion connecting a top portion of the left and right upright portions of the frame apparatus;
 a left support arm pivotably attached to a bottom of the left rail and a right support arm pivotably attached to a bottom of the right rail;
 a track adapted to support a motorcycle, the track attached to and supported by the left and right support arms; and
 a vertical threaded rod descending at a top end from the gear and chain housing and attached at a bottom end to a transverse rail connecting rod joining the bottom of the left and right rails, so that upon operation of an electric motor the left and right rails move either upwardly or downwardly.

9. The motorcycle lift according to claim 8 wherein the left and right support arms each have a pair of tie down support housings permanently attached to a cover for the support arms.

10. The motorcycle lift according to claim 8 wherein a tie-down rod extends from each tie-down support housing.

11. The motorcycle lift according to claim 8 wherein a pair of rollers within each bracket attaching a left or right rail to a corresponding left or right upright portion of the frame apparatus promotes movement of the upright rails with respect to the upright portions of the frame apparatus.

12. The motorcycle lift according to claim 8 wherein a left lift stabilizer is attached at one end to the left support arm and at its other end to the left upright rail and a right lift stabilizer is attached at one end to the right support arm and at its other end to the right upright rail.

13. The motorcycle lift according to claim 8 wherein a front lower portion of the left and right upright rail has a protruding stop, a lower portion of the left and right upright portions of the frame apparatus has a plate attached at a first end by a bracket and a second end is juxtaposed to the front lower portion of the corresponding left and right upright rail so that upward movement of the left and right rails cause the second end of the plate to engage the stop and therefore prevent lowering of the left and right rails.

14. A motorcycle lift mounted behind a rear portion of a motor home, the lift comprising:
 a frame apparatus engaged at a lower end to a first and second hitch member permanently attached to an underside structure of the motor home;
 the frame apparatus having a pair of parallel upright members joined at a top end by a transverse connecting rod, each upright member joined at a bottom end to a connector to the first and second hitch member, respectively;
 a left and right upright vertically movable rail, each attached by a pair of brackets to a corresponding upright member of the frame apparatus;

a bottom portion of each movable rail joined by a transverse rod;

a left and right support arm pivotably attached at a first end to the left and right movable rails respectively, a second end of the left and right support arms attached to a transverse track adapted to support a motorcycle; and the left and right rails moving in response to an electrically operated vertical screw drive attached at a top end to a housing containing a gear and chain drive and at a bottom end to a mid-portion of the transverse rod joining the movable rails, the housing attached to a mid-portion of the transverse connecting rod joining the upright members of the frame apparatus.

15. The motorcycle lift according to claim 14 wherein a front lower portion of the left and right upright rail has a protruding stop, a lower portion of the upright frame members has a plate attached at a first end by a bracket and a second end is juxtaposed to the front lower portion of the corresponding left and right upright rail so that upward movement of the left and right rails cause the second end of the plate to engage the stop and therefore prevent lowering of the left and right rails.

16. The motorcycle lift according to claim 14 wherein the transverse connecting rod of the frame apparatus and the transverse rod connecting the rails are expandable in conjunction with each other.

* * * * *